United States Patent [19]

Baricevic

[11] 4,334,357
[45] Jun. 15, 1982

[54] SAFETY BRAKING APPARATUS FOR A PORTABLE CHAIN SAW

[75] Inventor: John Baricevic, Redondo Beach, Calif.

[73] Assignee: Black & Decker Inc., Newark, Del.

[21] Appl. No.: 201,413

[22] PCT Filed: Aug. 8, 1980

[86] PCT No.: PCT/US80/01013
§ 371 Date: Oct. 30, 1980
§ 102(e) Date: Oct. 30, 1980

[87] PCT Pub. No.: WO82/00438
PCT Pub. Date: Feb. 18, 1982

[51] Int. Cl.³ .......................................... B27B 17/00
[52] U.S. Cl. .................................................... 30/381
[58] Field of Search ................. 30/381, 382, 383, 384, 30/385, 386

[56] References Cited
U.S. PATENT DOCUMENTS

| | | | |
|---|---|---|---|
| 3,776,331 | 12/1973 | Gustafsson | 30/381 |
| 3,964,333 | 6/1976 | Hirschkoff | 30/381 |
| 3,991,469 | 11/1976 | Frederickson | 30/381 |
| 4,057,900 | 11/1977 | Nagy et al. | 30/382 |
| 4,059,895 | 11/1977 | Hirschkoff | 30/382 |
| 4,121,339 | 10/1978 | Nikolich | 30/381 |
| 4,197,640 | 4/1980 | Murray | 30/382 |
| 4,246,701 | 1/1981 | Johansson | 30/382 |

FOREIGN PATENT DOCUMENTS 2919460 5/1979 Fed. Rep. of Germany ........ 30/381

Primary Examiner—Jimmy C. Peters
Attorney, Agent, or Firm—Harold Weinstein; Edward D. Murphy; Walter Ottesen

[57] ABSTRACT

A manually portable chain saw (10) having a gripping handle (18), a cutting chain (26), a sensing arm (30), and a motive force mechanism (14), features a releasable bistate mechanism (39a) for stopping cutting chain movement in response to forward movement of the sensing arm (30). The releasable bistate assembly (39a) captures an end of a brake band (40) for longitudinal movement in the direction of the brake band (40) and transverse movement in the direction of the long axis of the sensing arm (30). Independent adjustment of the forces on the sensing arm (30) and on the latch mechanism (49), and positive braking action are achieved. Separate spring biases (50, 52) are employed against the sensing arm (30) and the latch mechanism (49) respectively.

11 Claims, 4 Drawing Figures

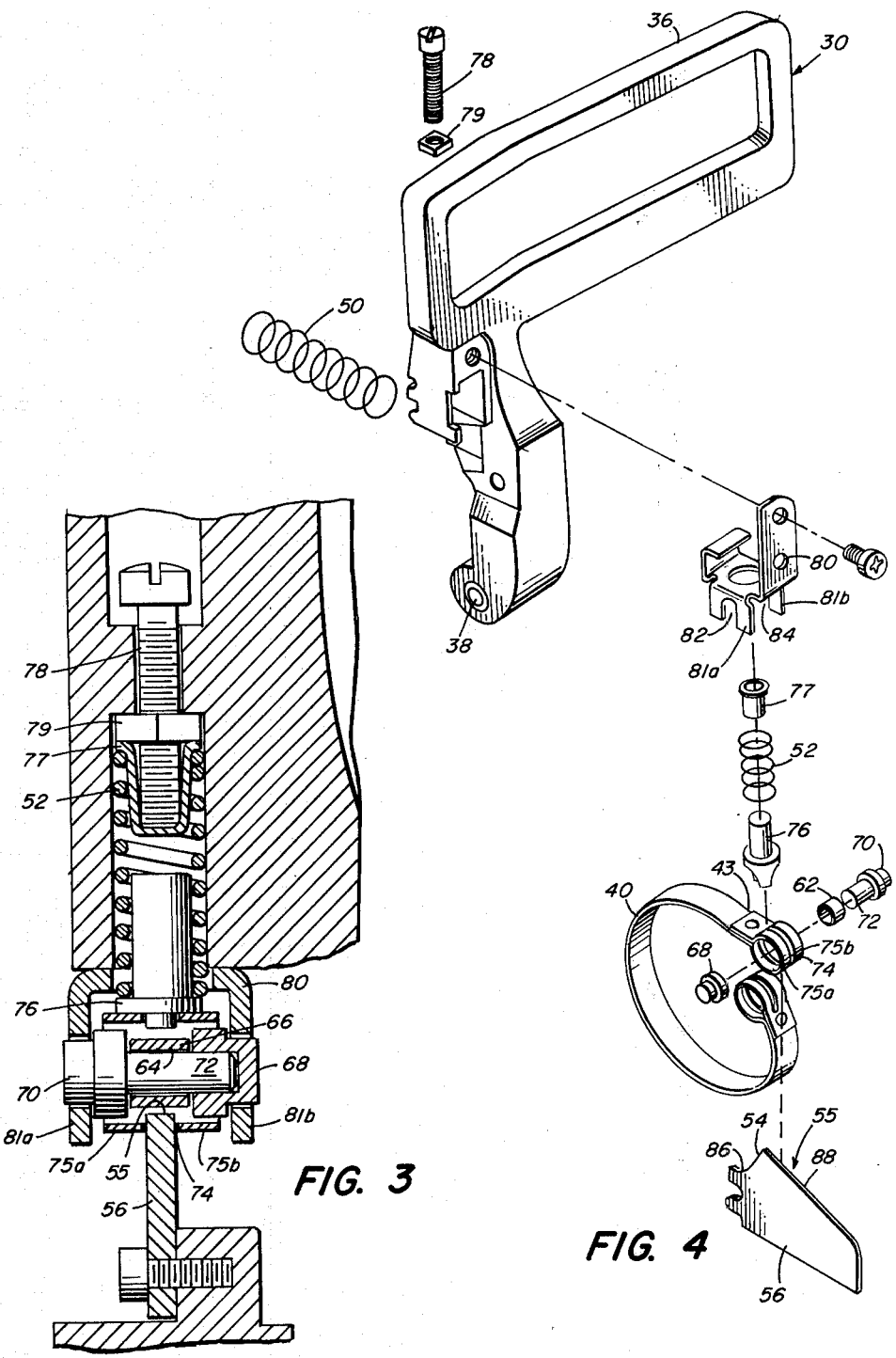

4,334,357

SAFETY BRAKING APPARATUS FOR A PORTABLE CHAIN SAW

BACKGROUND OF THE INVENTION

This invention relates to apparatus for improving the safety of a portable chain saw; and in particular, to an improved apparatus for braking the chain saw in the event of an unexpected or uncontrollable hazardous movement, to which chain saws can be subject.

It is well known that portable chain saws are subject to a potentially hazardous kick-back motion during operation, and that a chain brake can be provided to reduce the risk of operator injury in the event of a kick-back resulting in an untoward saw movement. The present state of the art has tended toward a less complicated and complex safety brake construction in which a safety brake handle is provided forward of a gripping handle, so that during kick-back, the operator's hand or arm will force the safety brake handle forward thereby applying a braking force to the chain saw motor. Such systems are applicable to both electrically powered and gasoline powered chain saws. While these newer systems often reduce the complexity of the mechanism, they can also tend to provide additional wear and less mechanical flexibility since a single spring is employed to perform the two tasks of resiliently restraining the safety brake handle and biasing the handle to the forward position. This dual requirement provides off-center forces which cause uneven wear on the latch and release mechanism components. Notwithstanding therefore the significant advancements in the art of safety brakes for chain saws, there still is room for further improvement.

Accordingly, therefore, it is an object of this invention to provide an improved chain braking structure for a portable chain saw. Other objects of the invention are to provide a safety brake mechanism for a chain saw having improved reliability, low manufacturing costs, greater flexibility, and applicability to both electric and gasoline powered chain saws.

SUMMARY OF THE INVENTION

The invention thus relates to a manually portable chain saw having a housing with a gripping handle, a cutting chain, a support bar projecting forwardly from the housing for supporting the cutting chain for endless movement, and a motive force mechanism carried by the housing for driving the cutting chain. The motive force mechanism can derive its power from either a gasoline or an electric motor.

The invention further has a safety brake assembly for stopping movement of the cutting chain. The safety brake assembly features the sensing arm mounted on the housing for swinging movement, a portion of the sensing arm being located forward of the gripping handle during operation of the chain saw and arranged to be swung in a forward direction in response to being struck by an operator of the chain saw. The brake assembly further features a flexible brake band including an anchoring assembly for securing a first band end, preferably to the housing, and a releasable bistate assembly for capturing a second end of the brake band for longitudinal movement in the direction of the brake band and transverse movement with respect to the sensing arm. With respect to the longitudinal movement, the captured second end has a first state, when the sensing arm is swung in the forward direction, wherein the flexible brake band moves into frictional braking engagement with the motive mechanism to stop the cutting chain, and a second state, when the sensing arm is swung to the rearward position, wherein the flexible brake band is loosely and non-interferingly spaced with respect to the motive mechanism movement. In the transverse movement direction, the brake band second end has a rest position wherein the second end is constrained, yieldingly, in the second state and a brake position wherein the second end can unimpededly move to the first state. The first state corresponds to a brake condition and the second state corresponds to a normal operating condition.

The invention further features a first spring arranged to urge the sensing arm to move in the forward direction for effecting movement of the second end of the brake band to the first state for braking movement. The bistate assembly features a fixed latch plate having an edge surface mounted so that the surface is in operative relation to the movable second end. A second spring is designed and arranged to provide a yieldable transversely directed latching force for urging the flexible band, at its second end, toward the latch plate, where, in the second state, the yieldable force of the second spring effects resilient resistance to movement of the second end toward the first state along the edge surface.

In a preferred embodiment of the invention, the portable chain saw safety brake assembly further has a second end mounting assembly, the fixed latch plate edge surface and the second end mounting assembly being cooperatively engaged, when the second band end is in the second state, for resisting, in response to forces against the sensing arm, for example from the first spring, movement of the second band end in the longitudinal direction to the first state. The second end mounting assembly features a mechanism for securing the second end for movement in the transverse direction. The securing mechanism includes a latch contacting member, an element for axially mounting the latch contacting member within a loop section of the band second end, and a second-spring guide assembly, positionally secured to the sensing arm, for capturing the second spring and for urging the second end and the latch contacting member together into transverse-directed, yielding contact with the latch plate. Thereby, the second end is yieldingly restrained in the second state against movement in the longitudinal direction by the camming surface of the latch plate and the yielding transverse-directed force of the second spring on the latch contacting member, and the second end can nevertheless move in response to forward movement of the sensing arm, against the force of the second spring, substantially in the transverse direction, and along the latch plate camming edge surface toward the first state.

BRIEF DESCRIPTION OF THE DRAWINGS

Other objects, features, and advantages of the invention will appear from the following description of a preferred embodiment together with the drawings, in which:

FIG. 3 is a diagrammatic cross-sectional view along lines 3—3 of FIG. 1; and

FIG. 4 is a diagrammatic assembly view showing the elements of the safety brake assembly.

DESCRIPTION OF A PREFERRED EMBODIMENT

Figure 1:
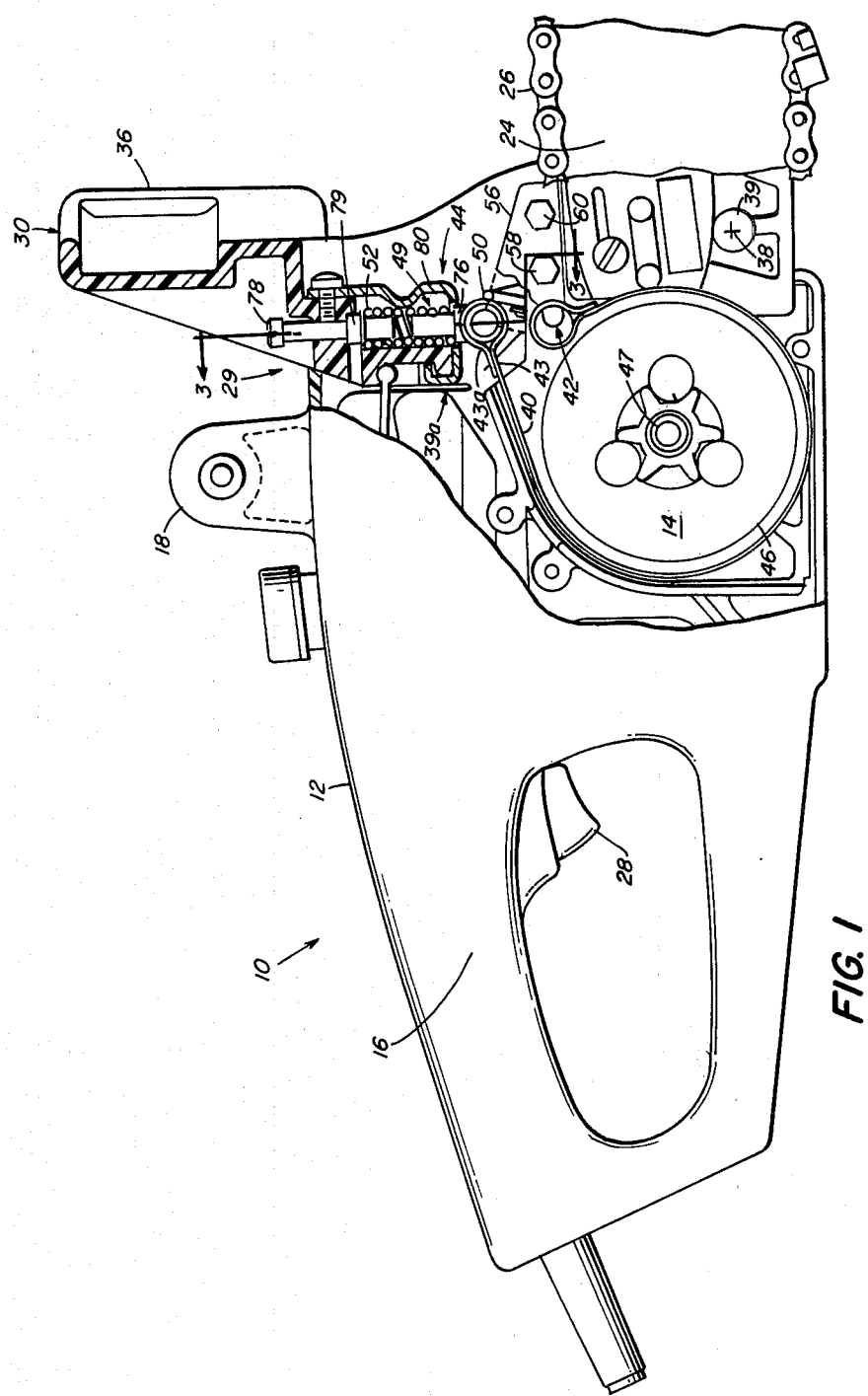
FIG. 1 is an elevation view of an electric portable chain saw with a portion broken away to show the safety brake assembly in its normal operating position according to the invention.

Referring to FIG. 1, a portable chain saw 10 includes a housing 12 which carries a motive drive assembly 14, driven, for example, by an electrically operated engine as is well known in the art. (A gasoline operated engine could also be employed.) The housing 12 further has a control handle 16 and a gripping handle 18, handle 18 being mounted in front of or forward the control handle and nearer the cutting chain portion of the housing. A cutter or guide bar 24 shown schematically in FIG. 1 projects forward from the housing 12 and supports a cutter chain 26 for endless movement therearound. The cutter chain is driven by a suitable power transmission of the motive drive assembly. The power transmission itself does not constitute the present invention and hence any suitable, and conventional, power transmission assembly can be utilized. Typical examples of a conventional power transmission assembly are disclosed in, for example, Moore et al U.S. pat. No. 2,947,399, Collins U.S. Pat. No. 3,385,411, and Hazzard U.S. Pat. No. 3,425,411, all assigned to the assignee of the present invention and all incorporated herein by reference.

Usually, the power transmission includes a chain sprocket wheel which is rotated by the engine drive shaft and around which is arranged the cutting chain 26. Rotation of the chain sprocket wheel drives the cutting chain in an endless fashion around the cutter bar 24.

During use of the chain saw 10, an operator typically grasps the control handle 16 with one hand and the gripping handle 18 with the other. The gripping handle is primarily used to manipulate and apply pressure to the chain saw while the control handle is utilized to stabilize the saw and control the rate of travel of the saw through operation of a trigger throttle 28. The operator is able to grasp various portions of the gripping handle 16 in order to properly orient the cutter chain.

The kick-back phenomenon can occur without warning, and endangers the safety of the operator. In order to minimize this danger the present invention involves the provision of a chain saw safety brake assembly 29.

According to the preferred embodiment of the invention, the safety assembly has a sensing arm 30 which is mounted on the housing for swinging movement. The sensing arm is generally an inverted U-shaped member having at least a horizontally extending top section 36. The lower extending portion of the sensing arm 30 is pivotally connected to the housing at a pivot axis 38, for example, by a bolt 39 so that the sensing arm is located forward of the gripping handle 18. The sensing arm is thus arranged to lie between the gripping handle 18 and the cutting chain 26 so as to be engaged by a hand or arm of an operator that approaches too close to the cutting chain. A dangerous condition of this type can occur, for example, should the operator's hand slip from the gripping handle or if the chain saw kicks back unexpectedly. In any event, the sensing arm is positioned to be swung forward upon being struck by the operator's arm or hand.

Operatively connected to the sensing arm 30 is the safety brake control assembly 39a. The brake control assembly includes a flexible brake band 40 which is anchored at one end by a bracket mounting 42, for example, to the housing 12. The other end 43, which has formed integral therewith a loop 43a of the flexible brake band 40, is mounted and secured for longitudinal and transverse movement by a band securing mechanism 44. This mechanism secures the brake band at its loop end 43a to the sensing arm for movement with respect to the arm substantially vertically in the transverse direction and for movement substantially horizontally in the longitudinal direction relative to the brake band end 43.

The brake band 40 is disposed around the peripheral surface of a brake drum 46. The illustrated brake drum 46 has a rotary element that is coupled to the power transmission of the motive drive assembly so that braking forces which are applied to the drum will serve to slow the cutter chain. For example, drum 46 can be coupled to a shaft 47 driven by the engine or to a sprocket wheel which drives the cutter chain. Alternatively, in those instances where a centrifugal clutch is utilized, such as disclosed in the previously mentioned Moore et al, Collins, and Hazzard patents, the cup of the clutch may advantageously serve as the brake drum.

In any event, as the chain saw engine and power transmission rotate the cutting chain, the drum 46 will also rotate. Should a braking force be applied to the drum (this occurs when the sensing arm is in its forward position), that force will be transmitted in a manner braking the cutter chain. It must be noted, however, that the brake drum, under normal operating conditions, is free-turning, and the brake band is spaced apart from and does not interfere with or place any limitations upon the cutting chain power transmission.

Figure 2:
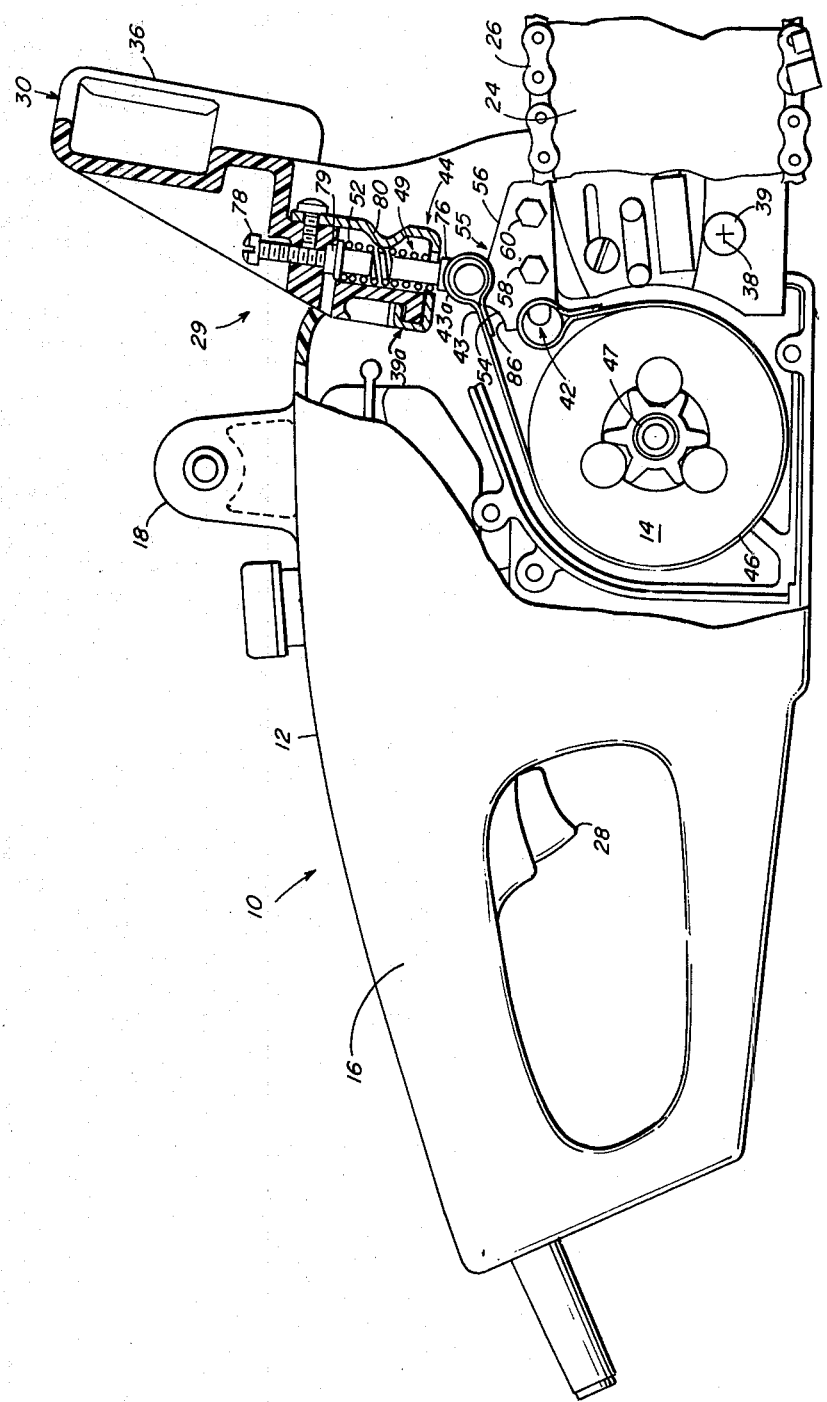
FIG. 2 is an elevation view of the portable chain saw of FIG. 1 showing the brake assembly in its brake condition.

The sensing arm 30 is rotatable between its rest position such as that shown in FIG. 1, which is the normal operating position for the arm, and a braking position shown in FIG. 2, in which the sensing arm has been swung forward about pivot axis 38. In the normal operating position of the sensing arm, the brake band is in a non-braking posture disposed loosely around the drum 46 so that no braking forces are exerted thereon. In the braking position of the sensing arm, the brake band 40 is in a braking condition, that is, it has been tightened against the brake drum 46. Thus the brake band is placed in frictional braking relationship with the power transmission to brake and halt movement of the cutter chain. The flexible brake band 40 presents a highly efficient braking element for a chain saw in that, being flexible, it is capable of engaging and exerting frictional force against a substantial portion of the drum 46 periphery.

In accordance with the present invention, a brake control mechanism 49 (which includes the band securing mechanism 44), of the brake control assembly 39a, is provided to resist any forward swinging movement of the sensing arm during normal operation of the chain saw and for positively swinging the sensing arm forward during a second "safety mode of operation" of the chain saw. According to the preferred embodiment, the brake control mechanism 49 has a first spring 50 arranged for biasing and urging the sensing arm 30 to move in the forward direction toward its braking position. The spring 50 is under compression, one end of the spring bearing against and secured by, for example, housing 12, and the other end of the spring bearing against a lower portion of the sensing arm 30. Thus, absent any restraining mechanism, sensing arm 30 is forced forward to pivot clockwise (FIG. 1) about its pivot axis to a brake position which tightens the brake band 40 against the brake drum 46.

The brake control mechanism further has a releasable bistate assembly having a second spring element 52 arranged to provide a yieldable, transversely directed, latching force in the illustrated downward direction against a latch plate 56. This latching force tends to maintain the sensing arm in its rest position as follows. The brake control mechanism spring 52 biases a roller assembly into contact with a camming edge surface portion 54 of an upper edge 55 of the latch plate 56. Illustrated latch plate 56 is secured to the housing by bolts 58 and 60. The roller assembly has a roller member 62 which is axially supported within the circular loop 43a formed at the end 43 of the brake band. The roller 62 has a bushing 64 and a roller element 66 and is axially supported within the loop by first and second hub members 68 and 70. Hub member 68 fits over, for example by a press fit, a shank portion 72 extending from hub member 70. The hub members 68 and 70 axially support and allow roller member 62 to rotate within a loop 43a formed at the end 43 of brake band 40.

The brake control mechanism biasing arrangement urges the roller 62 into contact with the upper edge 55 of latch plate 56. (The latch plate 56 upper edge fits into a slot 74 between bifurcated loop elements 75a, 75b of loop 43a.) The bias arrangement has a spring guide member 76 which engages loop 43 and guides, in operative biasing relationship, the spring 52 against the loop 43a (through the bottom section of guide member 76). A spring cap 77 fits within the top of spring 52 and has a hollow in a top interior portion into which an adjustment member, a screw member 78 adjustably secured in a fixed position with respect to the sensing arm 30 by a nut 80, provides adjustment for varying the bias pressure effected by the spring 52. The bias arrangement is secured in an operative position to the sensing arm 30 wherein spring 52 is under compression, and the roller 62 is in a resilient, bearing contact with the upper guide edge 55 of the latch plate 56 by a channel guide member 80. Guide member 80 has bifurcated, opposing downwardly directed side members, 81a, 81b which define opposing channels 82, 84 respectively in which the ends of hub members 68 and 70 respectively are captured for travel in the transverse direction.

In its assembled condition, the roller 62 resiliently engages the upper guide edge 55 of the latch plate 56 because the compression spring bias urges the roller into contact with the latch plate edge. The channel guide member 80 provides the motion control and "capture facility" needed to guide the roller 62 in its transverse motion. Thus, the illustrated end 43 (and in particular loop 43a) of brake band 40 can move in the transverse direction and is directed in that transverse movement by a spring-loaded, open-ended, resiliently-biased control mechanism.

This assembly, when the chain saw is operating normally, resiliently urges roller members 62 against the upper edge of latch plate 56 at lower portion 86. In this operating state, the force required to move the sensing arm 30 in the forward direction, corresponds to the force required to move the roller assembly along the upwardly inclined camming surface 54 onto an upper section 88 of the latch member 56. The initial force is determined by the components making up the assembly. Thus, the angle of camming surface 54 to the horizontal, the spring constants and degree of compression of springs 50 and 52, and the weights and positions of the various component structures all affect the force required before sensing arm 30 can swing forward. However, once the roller member 62 reaches the top of the camming surface 54, the spring 50 will positively urge sensing arm 30 to its forward braking position as roller 62 uninhibitedly rolls along edge section 88 in the longitudinally forward direction.

The sensing arm can be "reset" by retracting it, whereby the roller 62 passes down the ramp 54 into a stable condition with the brake released from engagement with the brake drum.

SUMMARY OF THE MAJOR ADVANTAGES AND NON-OBVIOUSNESS OF THE INVENTION

The safety brake mechanism described above enables the rapid and positive stoppage of the cutter chain while providing a convenient, flexible mechanism having a low cost. The ability to center the bias spring 52 over the operative components of the control mechanism reduces, when compared to, for example, springs which are offset, wear of the assembly components.

In addition, this system provides independent adjustment of the biasing mechanisms so that even after the design is set, further or different adjustment can still be made to vary the sensitivity of the safety mechanism.

Further, this apparatus advantageously provides a brake band end which itself forms an integral part of the latch mechanism and in particular a portion of the latch mechanism which moves both transversely and longitudinally to effect proper operation of the apparatus.

The prior art references of which we are aware, for example, Hirschkoff U.S. Pat. No. 3,964,333, Hirschkoff U.S. Pat. No. 4,059,895, and Naslund et al. U.S. Pat. No. 3,937,306 describe what are typical braking mechanisms of the prior art. The mechanisms described in those patents, and others, do not provide the advantageous independent movement of the brake end in both a longitudinal direction relative to the brake band end 43, and a transverse or lateral direction relative to the sensing arm. Furthermore, those mechanisms do not provide the advantage of controlling the movement of the brake band end by a biasing mechanism independent of the bias on the sensing arm, so that the brake end can itself operate integrally with the latching mechanism for relative movement therewith. In addition, the fixed latching member (as opposed to the typical situation wherein the brake end is fixed and the latch member is movable) advantageously provides simplicity and manufacturing advantage to the present apparatus which are not available in single spring brakes wherein different mechanical advantages, and the inevitable compromises associated therewith, must be taken into account because of the sometimes complex structure of the movable latching elements.

The present invention has been described in connection with an electrically operated chain saw. The invention is clearly equally applicable to a gasoline powered chain saw wherein the only substantial change is in the nature of the motive force source.

Additions, subtractions, deletions, and other modifications of the described embodiment will be obvious to those skilled in the art and are within the scope of the following claims.

What is claimed is:

1. In a manually portable chain saw having
a housing with a gripping handle,
a cutting chain, a support bar projecting forwardly from the housing for supporting the cutting chain for endless movement, and a motive force means carried by the housing for driving the cutting chain, a safety brake means for stopping movement of the cutting chain comprising:

a sensing arm mounted on said housing for swinging movement, a portion of said sensing arm being located forward of said gripping handle during operation of the chain saw and arranged to be swung in a forward direction in response to being struck by an operator of the chain saw, a flexible brake band, means for anchoring a first end of said brake band, releasable bistate means for capturing a second end of said brake band for longitudinal and transverse movement in response to movement of said sensing arm, said second end in said longitudinal movement direction having a first state when said sensing arm is in said forward direction wherein said flexible brake band moves into frictional braking engagement with said motive means to stop said cutting chain and a second state when said sensing arm is in a normal operating rearward direction wherein said flexible brake band is loosely and non-interferingly spaced with respect to said motive means, said second end in said transverse movement having a rest position wherein said second end is yieldingly constrained in said second state and a brake position wherein said second end can unimpededly move to said first state, a first spring arranged for urging said sensing arm to move in the forward direction for effecting movement of said second end to said first state for braking movement, and said bistate means having a fixed latch plate having an edge surface mounted in operative relation to said movable second end, and a second spring arranged to provide a yieldable transversely directed latching force for urging said flexible brake band, at said second end, toward said latch plate, whereby, in said second state the yieldable force of said second spring effects resilient resistance to movement of said second end toward said first state along said edge surface.

2. The safety brake means of claim 1 wherein said releasable bistate means further comprises a second end mounting assembly, said fixed latch plate edge surface and said second end mounting assembly being cooperatively engaged when said second band end is in said second state for resisting movement of said band second end in said longitudinal direction to said first state, and said second end mounting assembly comprises means for securing said second end for movement in said transverse direction, said securing means having a latch contacting member, means for axially mounting said latch contacting member within a loop section of said second band end, and a second-spring guide assembly positionally secured to said sensing arm for capturing said second spring for urging said second end and said latch contacting member into transversely-directed yielding contact with said latch plate, whereby said second end is yieldingly restrained in said second state against movement in said longitudinal direction by a camming surface of said latch plate edge surface and the transversely-directed yielding force of said second spring on said latch contacting member, and wherein said second end can move, in response to forward movement of said sensing arm, against the force of said second spring, substantially in said transverse direction, and along said latch plate camming surface toward said first state.

3. The safety brake means of claim 2 wherein said band second end has a bifurcated loop section having a closed curvelinear shape, said latch contacting member comprises a roller element, and said axial mounting means mounts said roller element within said loop section and comprises first and second hub members in axial alignment with said roller for supporting said roller for rotation about a roller rotation axis, and said spring guide assembly comprises a channel guide member fixedly connected to said sensing arm and having a roller guide section for guiding said hub members for movement in said transverse direction, said roller guide section having opposed bifurcated side members for providing travel guide slots for said movement of said hub members in said transverse direction.

4. The safety brake means of claim 2 wherein said second-spring guide assembly further comprises an adjustable stop means for variably engaging said second spring to adjust the yieldable resilience of said second spring acting on said latch contacting member in contact with said latch means.

5. The safety brake means of claim 4 wherein said adjustable stop means comprises a threaded screw tensioning element and means for capturing said screw tensioning element in an operative position on said sensing arm whereby the spring pressure for yieldingly urging said latch contacting member against said latch member can be variably adjusted independently of the force urging said sensing arm in said forward direction toward said first state.

6. The safety brake means of claim 1 further comprising a roller element, means for securing said roller element in alignment within a closed loop of said second end of said brake band, said roller securing means having engaging hub members for engaging and axially supporting said roller element within said loop for rotary movement in contact with said fixed latch plate, and a channeled guide member fixedly mounted to said sensing arm for movement therewith, and for capturing said engaging hub members for yielding movement, relative to said guide member, only in said transverse direction, said guide member having opposed channel sections in which said hub members move in response to the forces transmitted thereto.

7. In a manually portable chain saw having
a housing with a gripping handle,
a cutting chain,
a support bar projecting forwardly from the housing for supporting the cutting chain for endless movement, and
a motive force means carried by the housing for driving the cutting chain,
a safety brake means for stopping movement of the cutting chain comprising:
a sensing arm mounted on said housing for swinging movement, a portion of said sensing arm being located forward of said gripping handle during operation of the chain saw and arranged to be swung in a forward direction in response to being struck by an operator of the chain saw,
a flexible brake band,
means for anchoring a first end of said brake band,
releasable bistate means for capturing a second end of said brake band for longitudinal and transverse movement in response to movement of said sensing arm,
said second end in said longitudinal movement direction having a first state when said sensing arm is in said forward direction wherein said flexible brake band moves into frictional braking engagement with said motive means to stop said cutting chain and a second state when said sensing arm is in a normal operating rearward direction wherein said flexible brake band is loosely and non-interferingly spaced with respect to said motive means,
said second end in said transverse movement having a rest position wherein said second end is yieldingly constrained in said second state and a brake position wherein said second end can unimpededly move to said first state,
a first spring arranged for urging said sensing arm to move in the forward direction for effecting movement of said second end to said first state for braking movement,
said bistate means having
a fixed latch plate having an edge surface mounted in operative relation to said movable second end, and
a second end mounting assembly,
a second spring arranged to provide a yieldable transversely directed latching force for urging said flexible brake band, at said second end, toward said latch plate, whereby, in said second state the yieldable force of said second spring effect resilient resistance to movement of said second end toward said first state along said edge surface,
said fixed latch plate edge surface and said second end mounting assembly being cooperatively engaged when said second band end is in said second state for resisting movement of said band second end in said longitudinal direction to said first state,
said second end mounting assembly comprising
means for securing said second end for movement in said transverse direction, said securing means having
a roller element,
means for axially mounting said roller element within a loop section of said second band end comprising first and second hub members in axial alignment with said roller for supporting said roller for rotation about a roller rotation axis, and
a second-spring guide assembly positionally secured to said sensing arm for capturing said second spring for urging said second end and said latch contacting member into transversely-directed yielding contact with said latch plate,
said spring guide assembly comprising
a channel guide member fixedly connected to said sensing arm and having a roller guide section for guiding said hub members for movement in said transverse direction, said roller guide section having opposed bifurcated side members for providing travel guide slots for said movement of said hub members in said transverse direction, and
an adjustable stop means for variably engaging said second spring to adjust the yieldable resilience of said second spring acting on said latch contacting member in contact with said latch means,
whereby said second end is yieldingly restrained in said second state against movement in said longitudinal direction by a camming surface of said latch plate edge surface and the transversely-directed yielding force of said second spring on said roller element, and wherein said second end can move, in response to forward movement of said sensing arm, against the force of said second spring, substantially in said transverse direction, and along said latch plate camming surface toward said first state.

8. A brake assembly for a portable chain saw having a housing with a handle, a guide bar extending forwardly of the housing and carrying a saw chain thereon, a motive means mounted in the housing, a drive assembly coupled to the motive means to drive the saw chain, the drive assembly including a brake drum, the brake assembly comprising:
a sensing arm pivotally mounted in the housing adjacent to and forwardly of the handle,
the sensing arm is shiftable between a nonbraking position and a braking position responsive to predetermined operator contact,
a latch plate fixedly connected to the housing,
a camming surface formed on the latch plate,
a brake band surrounding the brake drum, and having an anchored end affixed to the housing and a shiftable end carried by the sensing arm to yieldably engage the latch plate, and
spring means operatively associated with the brake assembly and the housing having a first balance position corresponding to the nonbraking position of the sensing arm yieldably to urge the shiftable end of the brake band in engagement with the camming surface of the latch plate, and having a second unbalanced position enabled by said predetermined operator contact with the sensing arm releasing said shiftable end from the camming surface to unbalance the spring means which forces the sensing arm to be shifted into the braking position whereby the brake assembly stops the rotation of the saw chain.

9. The combination claimed in claim 8 wherein:

the spring means including a first spring urging the sensing arm toward the braking position, and a second spring yieldably holding the shiftable end of the brake band upon the camming surface normally to keep the sensing arm in the nonbraking position by at least balancing the force exerted thereon by the first spring.

10. The combination claimed in claim 9 wherein:

the second spring carried by the sensing arm to engage the shiftable end of the brake band, and adjustment means connected to the sensing arm to engage the second spring and adapted to change the force thereof exerted upon the shiftable end.

11. The combination claimed in claim 9 wherein:

the camming surface including an arcuate portion defining a ramp, the shiftable end of the brake band including a roller engaging the latch plate, and the roller yieldably engaging the ramp with the spring means in the balanced position and releasable therefrom by the predetermined operator contact of the sensing arm to shift the spring means into the unbalanced position causing the sensing arm to be forced into the braking position.

* * * * *